April 30, 1963   R. L. JACOBS   3,087,363
HAND WIRE STRIPPER
Filed Nov. 7, 1960

Inventor
Robert L. Jacobs
By Anthony W. Cennamo

United States Patent Office 3,087,363
Patented Apr. 30, 1963

3,087,363
HAND WIRE STRIPPER
Robert L. Jacobs, Hilliard, Ohio, assignor to Industrial Nucleonics Corporation, a corporation of Ohio
Filed Nov. 7, 1960, Ser. No. 67,769
6 Claims. (Cl. 81—9.5)

This invention relates to wire stripping devices, and more particularly to a compact tool which can be operated with one hand to strip the insulation from the ends of wires of various sizes.

In the manufacture of electronic apparatus, where it is necessary to install many pieces of variously sized insulated wire, it is not always desirable nor practical to pre-cut and pre-strip the wire for its various uses. Hence it may be desirable to solder, or otherwise attach, the wire in the equipment at one terminal and later to cut it to length and strip the insulation from the other end for the final connection. Since, oftentimes, these wires will be located in difficult to get at places, it is desirable to have an insulation stripping device which is compact overall, and especially one whose wire clamping and stripping portions require minimum space. Furthermore, in many instances only the ends of the wires will be sufficiently protruded from the apparatus, thereby making wire strippers of the side cutter type unusable.

The present invention teaches a compact end wire stripper that is of the hand type and whose wire clamping and stripping portions require only minimum space.

It is an object of this invention, therefore, to provide an improved wire stripping device especially adapted for use where only the end of the wire is accessible.

It is a further object of this invention to provide an improved wire stripping device in which the movement of the cutter is longitudinal of the wire.

It is another object of this invention to provide an improved wire stripping device in which the clamping jaws and stripping knives are rugged, simple of design, and adaptable to present day tool making.

It is another object of this invention to provide an improved wire stripping device which is efficient and easy to operate.

Still another object of the present invention is to provide an improved wire stripping device that is adjustable to permit use with various sizes of wires.

Further objects and features of the present invention will become apparent from the following detailed description taken in conjunction with the drawings in which.

Figure 1:
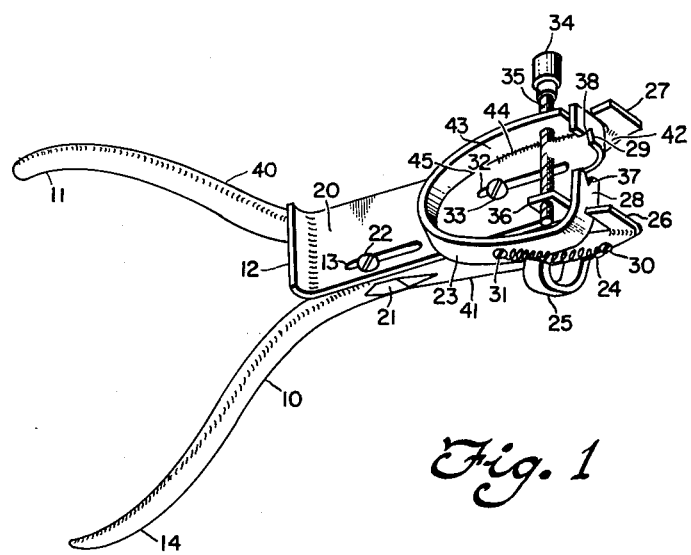
FIG. 1 is a perspective view of a wire stripping device according to the present invention.

Referring now to the figures, there is shown the teachings of my invention comprising a pair of lever members 10 and 40 connected together at a pivot point 21. The upper arms of these members are formed with a pair of stripping levers 41 and 42, and the lower arms constitute operating handles 11 and 14. Attached to inwardly directed end portions of the levers 41 and 42 are a pair of clamping jaws 26 and 27, between which the wire to be stripped is adapted to be held. Immediately behind the clamping jaws 26 and 27 are a pair of combined cutting and stripping jaws 28 and 29, carried adjacent the ends of the levers 41 and 42.

Pivotally fastened to levers 41 and 42 is an assembly that includes the flat elongated plate 20 with a curved end portion 12 at its one end. At the other end of the plate 20 there is formed integrally therewith at right angles with the plate 20 at point 44 a clip 43. Commencing at point 45 the clip 43 is no longer fastened to the plate 20 and begins a curvature to form a spring-like U-shaped clip 23. The one end of the clip 23 being further bent to a right angle position with respect to the longitudinal axis of the entire assembly and also of the wire as hereinafter explained. The extreme portion of this end 28 of the clip 23 has a notch 37 formed therein. At the upper right hand end of plate 20 a portion thereof is extended and bent inwardly and at right angles to be in vertical alignment with end 28 of the clip 23. This cutter is of a size to just meet with the upper end of clip wall 43.

Formed in the inner side of the cutter 29 is another notch 38. Notches 37 and 38 are generally in a V-shape and have their edges beveled for cutting. The inner part of the two V-shaped notches face each other to permit cutting into the wire disposed therebetween.

At a mid-portion of lever 41 there is secured a pusher element 25. This pusher is generally U-shaped except that one arm is somewhat longer than the other. The end of the longer arm of this element 25 is secured to the lever 41. The shorter arm of the element 25 is just short enough to permit gripping of the wire to be stripped by the grippers 26 and 27. The short arm of element 25 is adapted to engage the outer surface of clip 23 to force the cutters 28 and 29 to penetrate the insulation. Threadingly engaging the clip 43 is a screw 35 which engages a tapped support 36 provided in the lower right hand end of plate 20. Adjusting cap 34 permits the adjustment of the screw 35 to limit the upward movement of the clip arm 23 and hence the minimum separation between the cutters 28 and 29.

Plate 20 has a pair of slots formed therein; the first slot 32 is at the upper right hand position of the plate 20 and the other slot 13 is at the lower left hand portion of plate 20. Engaging the two slots 32 and 13 are screws 33 and 22 respectively. Screw 33 engages lever 42 and screw 22 engages lever 41. Each of these screws is tightened only enough to permit sliding motion of the plate 20 longitudinally of the lever arms 41 and 42.

Figure 2:
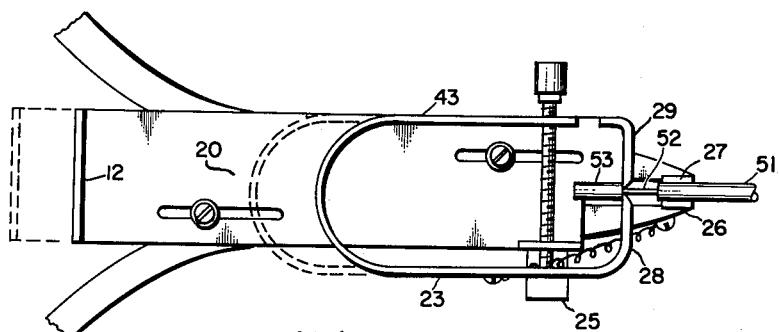
FIG. 2 is a partial side view illustrating again the gripping, cutting, and stripping action of the wire stripper of the present invention.

In the operation of the device thus far described, the operating lever members 11 and 14 are adapted to be opened to separate the clamping jaws 26 and 27, and stripping jaws 28 and 29, sufficiently to permit of the ready insertion of the wire therebetween. As the lever members are brought together the clamping jaws 26 and 27 firmly grip the interposed wire and the cutting and stripping jaws 28 and 29 cut into the insulation 53 of the wire 51 as shown in FIG. 2.

Thereafter, by imparting a rearward movement to the plate 20 through actuation of the thumb portion 12 there is effected a movement of the stripping jaws 28 and 29 relative to the wire. The insulation 53 is removed from the wire 51 thereby exposing the inner conductor 52. After the stripping of the wire has been effected in the manner described, the operating lever members 11 and 14 are opened and the stripping jaws 28 and 29 returned to their normal separated position, under the action of a spring 24 which is connected at one end to the lever 41 at point 30 and at its opposite end to the cutter clip 23 at point 31.

Although there is shown one preferred embodiment of my invention, modifications may be made without departing from the true spirit and scope of the invention.

What is claimed is:

1. A wire stripping device comprising a pair of operating handles hingedly joined and terminating in an upper and a lower gripping jaw, a plate member, means for slidably mounting said plate member on said operating handles for movement in the plane thereof, a curved spring strip terminating in an upper and a lower cutting jaw, means for mounting the upper portion of said curved spring strip on said slidable plate member to fixedly position said upper cutting jaw behind said upper gripping jaw and an actuator member connected to said lower gripping jaw and extending upwardly against said spring strip adjacent to said lower cutting jaw, to urge together said cutting jaws when said gripping jaws are brought together, while permitting sliding movement of said plate and said cutting jaws relative to said gripping jaws during the stripping operation.

2. The wire stripping device as set forth in claim 1 which further includes adjustable means between said upper and lower cutting jaws for controlling the separation of said jaws when said gripping jaws are urged together.

3. A wire stripping device comprising a pair of levers pivotally joined together between their ends to form pliers having handle portions and workpiece manipulating portions at opposite ends of said pair, a plate member having one surface positioned adjacent to a common outboard side of said manipulating portions; cooperative wire-gripping jaws on the ends of said levers constituting said manipulating portions, said gripping jaws extending laterally in the direction of said outboard side and beyond said plate member; a first wire-stripping jaw secured to said plate member, a U-shaped spring strip having one end secured to said plate member adjacent to said first stripping jaw, the other end of said spring strip having a substantially straight portion; a second wire-stripping jaw secured to said other end of said spring strip and facing said first wire-stripping jaw in cooperative relationship, means for slidably attaching said plate member to one of said levers in the region of said manipulating portions, and a compression actuator secured to the other of said levers in said region, said actuator having a bearing portion for pressing against the outside surface of said straight portion of said spring strip so as to urge said second stripping jaw in the direction of said first stripping jaw against the counteracting pressure of said spring strip when said gripping jaws are brought together in the gripping operation of said pliers, while permitting sliding movement of said spring strip and said plate relative to said gripping jaws during the stripping operation.

4. A wire stripping device comprising a pair of levers pivotally joined together between their ends to form pliers having handle portions and workpiece manipulating portions at opposite ends of said pair, a plate member having one surface positioned adjacent to a common outboard side of said manipulating portions; cooperative wire gripping jaws on the ends of said levers constituting said manipulating portions, said gripping jaws extending laterally in the direction of said outboard side and beyond said plate member; a first wire-stripping jaw secured to said plate member, a U-shaped spring strip having one end secured to said plate member adjacent to said first stripping jaw, the other end of said spring strip having a substanitally straight portion; a second wire-stripping jaw secured to said other end of said spring strip and facing said first wire-stripping jaw in cooperative relationship, means for slidably attaching said plate member to one of said levers in the region of said manipulating portions, a compression actuator secured to the other of said levers in said region, said actuator having a bearing portion for pressing against the outside surface of said straight portion of said spring strip so as to urge said second stripping jaw in the direction of said first stripping jaw against the counteracting pressure of said spring strip when said gripping jaws are brought together in the gripping operation of said pliers while permitting sliding movement of said spring strip and said plate relative to said gripping jaws durng the stripping operation, and adjusting means secured to said plate member and engaging the inside surface of said straight portion of said spring strip for adjustably limiting the movement of said second stripping jaw toward said second stripping jaw.

5. A wire stripping device comprising a pair of levers pivotally joined together between their ends to form pliers having handle portions and workpiece manipulating portions at opposite ends of said pair, a plate member having one surface adjacent to a common outboard side of said manipulating portions; cooperative wire gripping jaws on the ends of said levers constituting said manipulating portions, said gripping jaws extending laterally in the direction of said outboard side and beyond said plate member; a first wire stripping jaw secured to said plate member, a U-shaped spring strip having one end secured to said plate member adjacent to said first stripping jaw, the other end of said spring strip having a substantially straight portion; a second wire stripping jaw secured to said other end of said spring strip and facing said first wire stripping jaw in cooperative relationship, means for slidably attaching said plate member to one of said levers in the region of said manipulating portions, a compression actuator secured to the other of said levers in said region, said actuator having a bearing portion for pressing against the outside surface of said straight portion of said spring strip so as to urge said second stripping jaw in the direction of said first stripping jaw against the counteracting pressure of said spring strip when said gripping jaws are brought together in the gripping operation of said pliers while permitting sliding movement of said spring strip and said plate relative to said gripping jaws during the stripping operation, and spring means urging said plate member, said spring strip and said stripping jaws in the direction of said gripping jaws.

6. A wire stripping device comprising a pair of levers pivotally joined together between their ends to form pliers having handle portions and workpiece manipulating portions at opposite ends of said pair, a plate member having one surface adjacent to a common outboard side of said manipulating portions; cooperative wire gripping jaws on the ends of said levers constituting said manipulating portions, said gripping jaws extending laterally in the direction of said outboard side and beyond said plate member; a first wire-stripping jaw secured to said plate member, a U-shaped spring strip having one end secured to said plate member adjacent to said first stripping jaw, the other end of said spring strip having a substantially straight portion; a second wire-stripping jaw secured to said other end of said spring strip and facing said first wire-stripping jaw in cooperative relationship, means for slidably attaching said plate member to one of said levers in the region of said manipulating portions, a compression actuator secured to the other of said levers in said region, said actuator having a bearing portion for pressing against the outside surface of said straight portion of said spring strip so as to urge said second stripping jaw in the direction of said first stripping jaw against the counteracting pressure of said spring strip when said gripping jaws are brought together in the gripping operation of said pliers while permitting sliding movement of said spring strip and said plate relative to said gripping jaws during the stripping operation, spring means urging said plate member, said spring strip and said stripping jaws in the direction of said gripping jaws, and a thumb operator secured to said plate and extending in the direction of said handle portions to permit thumb-energized movement of said plate against the force provided by said spring means.

References Cited in the file of this patent

UNITED STATES PATENTS

| 1,151,319 | Wood | Aug. 24, 1915 |
| 1,618,734 | Smitak | Feb. 22, 1927 |
| 2,451,463 | Zimmermann | Oct. 19, 1948 |
| 2,735,320 | Green | Feb. 21, 1956 |
| 2,932,224 | Peed et al. | Apr. 12, 1960 |
| 2,995,051 | Redway | Aug. 8, 1961 |

FOREIGN PATENTS

| 780,257 | France | Jan. 29, 1935 |